United States Patent
Naitou et al.

(10) Patent No.: US 7,814,353 B2
(45) Date of Patent: Oct. 12, 2010

(54) POWER MANAGEMENT SYSTEM FOR A COMMUNICATION DEVICE

(75) Inventors: Mitsuhiro Naitou, Okazaki (JP); Kunihiro Yamada, Okazaki (JP); Satoshi Ogawa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 275 days.

(21) Appl. No.: 11/525,936

(22) Filed: Sep. 25, 2006

(65) Prior Publication Data

US 2007/0016813 A1 Jan. 18, 2007

Related U.S. Application Data

(63) Continuation of application No. 10/633,684, filed on Aug. 5, 2003, now abandoned.

(30) Foreign Application Priority Data

Aug. 9, 2002 (JP) ............ 2002-232656
Aug. 9, 2002 (JP) ............ 2002-232699

(51) Int. Cl.
*G06F 1/26* (2006.01)
*G06F 1/32* (2006.01)

(52) U.S. Cl. ............ 713/320; 713/300; 713/324; 701/25; 701/200

(58) Field of Classification Search ............ 701/25, 701/200; 713/300, 320, 324
See application file for complete search history.

(56) References Cited

U.S. PATENT DOCUMENTS

| | | | |
|---|---|---|---|
| 5,223,844 A * | 6/1993 | Mansell et al. | 342/357.07 |
| 5,714,946 A * | 2/1998 | Gottshall et al. | 340/870.16 |
| 5,949,812 A | 9/1999 | Turney et al. | |
| 6,192,230 B1 | 2/2001 | van Bokhorst et al. | |
| 6,198,995 B1 | 3/2001 | Settles et al. | |
| 6,256,742 B1 * | 7/2001 | Konaka et al. | 713/320 |
| 6,282,495 B1 | 8/2001 | Kirkhart et al. | |
| 6,356,841 B1 | 3/2002 | Hamrick et al. | |
| 6,367,022 B1 | 4/2002 | Gillespie et al. | |
| 6,374,169 B1 | 4/2002 | Demay et al. | |
| 6,408,232 B1 * | 6/2002 | Cannon et al. | 701/29 |
| 6,463,542 B1 * | 10/2002 | Yu et al. | 713/320 |
| 6,600,990 B2 * | 7/2003 | Takenaga | 701/200 |

(Continued)

FOREIGN PATENT DOCUMENTS

JP    A-04-255157    9/1992

(Continued)

OTHER PUBLICATIONS

Japanese Patent Office, Partial Translation of Notification of Reason(s) for Refusal mailed Nov. 27, 2007 in Japanese Patent Application No. 2003-206902 w/English-language Translation.

*Primary Examiner*—Chun Cao
*Assistant Examiner*—Jaweed A Abbaszadeh
(74) *Attorney, Agent, or Firm*—Oliff & Berridge, PLC (57) ABSTRACT

A power management system for a communication device, including an accessory-signal generating device; the communication device; and a power management device for supplying electric power to the communication device if the accessory-signal generating device is not generating accessory signals and the communication device is in a communication-ready state.

11 Claims, 7 Drawing Sheets

U.S. PATENT DOCUMENTS

| | | | |
|---|---|---|---|
| 6,650,999 B1 * | 11/2003 | Brust et al. | 701/213 |
| 6,760,853 B2 * | 7/2004 | Murakami | 713/330 |
| 6,772,353 B2 * | 8/2004 | Konaka et al. | 713/300 |
| 6,947,732 B2 * | 9/2005 | Fraser | 455/420 |
| 6,973,476 B1 * | 12/2005 | Naden et al. | 709/203 |
| 7,116,894 B1 * | 10/2006 | Chatterton | 386/95 |
| 7,142,810 B2 * | 11/2006 | Oesterling | 455/9 |
| 7,149,530 B1 * | 12/2006 | Arakawa et al. | 455/456.1 |
| 7,177,738 B2 * | 2/2007 | Diaz | 701/29 |
| 7,372,818 B2 * | 5/2008 | Fraser et al. | 370/252 |
| 7,398,082 B2 * | 7/2008 | Schwinke et al. | 455/419 |
| 7,564,810 B2 * | 7/2009 | Hernandez et al. | 370/311 |
| 2001/0003164 A1 * | 6/2001 | Murakami | 700/22 |
| 2001/0012979 A1 * | 8/2001 | Takenaga | 701/200 |
| 2001/0020891 A1 | 9/2001 | Minagawa et al. | |
| 2001/0021981 A1 * | 9/2001 | Konaka et al. | 713/300 |
| 2001/0029588 A1 * | 10/2001 | Nakamura et al. | 713/300 |
| 2002/0025839 A1 | 2/2002 | Usui | |
| 2002/0174360 A1 | 11/2002 | Ikeda | |
| 2003/0053433 A1 * | 3/2003 | Chun | 370/338 |
| 2003/0098784 A1 * | 5/2003 | Van Bosch et al. | 340/425.5 |
| 2004/0203340 A1 * | 10/2004 | Oesterling | 455/9 |
| 2004/0203692 A1 * | 10/2004 | Schwinke et al. | 455/419 |
| 2006/0052092 A1 * | 3/2006 | Schwinke et al. | 455/415 |

FOREIGN PATENT DOCUMENTS

| | | |
|---|---|---|
| JP | A 05-153024 | 6/1993 |
| JP | A 09-064805 | 3/1997 |
| JP | A-9-275587 | 10/1997 |
| JP | A-10-107718 | 4/1998 |
| JP | A-10-303806 | 11/1998 |
| JP | A-10-306639 | 11/1998 |
| JP | A-11-05327 I | 2/1999 |
| JP | A-11-304502 | 11/1999 |
| JP | A-2000-174689 | 6/2000 |
| JP | A-2000-209674 | 7/2000 |
| JP | A-2001-134895 | 5/2001 |
| JP | A-2002-071355 | 3/2002 |
| JP | A-2002-187523 | 7/2002 |

* cited by examiner

POWER MANAGEMENT SYSTEM FOR A COMMUNICATION DEVICE

INCORPORATION BY REFERENCE

This application is a continuation of U.S. application Ser. No. 10/633,684, filed Aug. 5, 2003, which claims priority of the disclosures of Japanese Patent Application No. 2002-232656 filed Aug. 9, 2002, and Japanese Patent Application No. 2002-232699 filed Aug. 9, 2002. The disclosures of these applications, including the specifications, drawings and claims, are incorporated herein by reference in their entirety.

BACKGROUND OF THE INVENTION

1. Field of Invention

The invention relates to a power management system for a communication device.

2. Description of Related Art

There are conventional on-board navigation systems, wherein route guidance data is preliminarily transmitted to the on-board navigation system prior to a user's departure and the user is provided with route guidance based on the transmitted route guidance data at his or her departure (please refer to Japanese patent laid-open H6-243395 and H9-189566.) In this conventional system, the user operates a personal computer at home or at work in order to input a destination, a route search criterion, and the like. As a result, a route is searched and route guidance data is transmitted to a navigation apparatus over wireless communication. With such conventional system, the user is provided with the route guidance from the beginning of his or her drive. However, inconveniently, inputting a destination, a route search criterion, and the like; searching the route; and transmitting the data must be carried out while the vehicle is stopped or parked.

SUMMARY OF THE INVENTION

In the conventional systems, an on-board vehicle navigation apparatus or an on-board audio apparatus is designed to receive data while the vehicle is parked and the power thereof is off. In order to receive the data, however, the on-board apparatus must be powered. Usually when the vehicle is parked, both the engine of the vehicle and an alternator attached thereto are stopped. Therefore, a vehicle battery is used as a power supply for the on-board apparatus. However, the capacity of the vehicle battery is limited and there is a possibility that the battery will die if the on-board apparatus is only powered by a vehicle battery. This is a problem with the conventional system.

For solving the above-described problems peculiar to the conventional systems, the invention provides a new system, wherein the flow of electric power to the communication device is controlled when no accessory-signal is generated. Such control minimizes the power consumption of the communication device, reducing a discharge of the electric power supplied from the vehicle battery.

Therefore, the invention provides a power management system for a communication device, including an accessory-signal generating device; the communication device; and a power management device for supplying electric power to the communication device if the accessory-signal generating device is not generating accessory signals and the communication device is in a communication-ready state.

Furthermore, the invention provides a power management system for a communication device, including an accessory-signal generating device; a first communication device; a second communication device; a power management device for supplying electric power to the second communication device if the accessory-signal generating device is not generating accessory signals and the first communication device is in a communication-ready state; and a startup management device for activating at least the first communication device upon receipt of startup-signals from the second communication device.

BRIEF DESCRIPTION OF THE DRAWINGS

Embodiments according to the invention will be described hereinafter in detail with reference to the accompanying drawings, wherein.

DETAILED DESCRIPTION OF PREFERRED EMBODIMENTS

Figure 2:
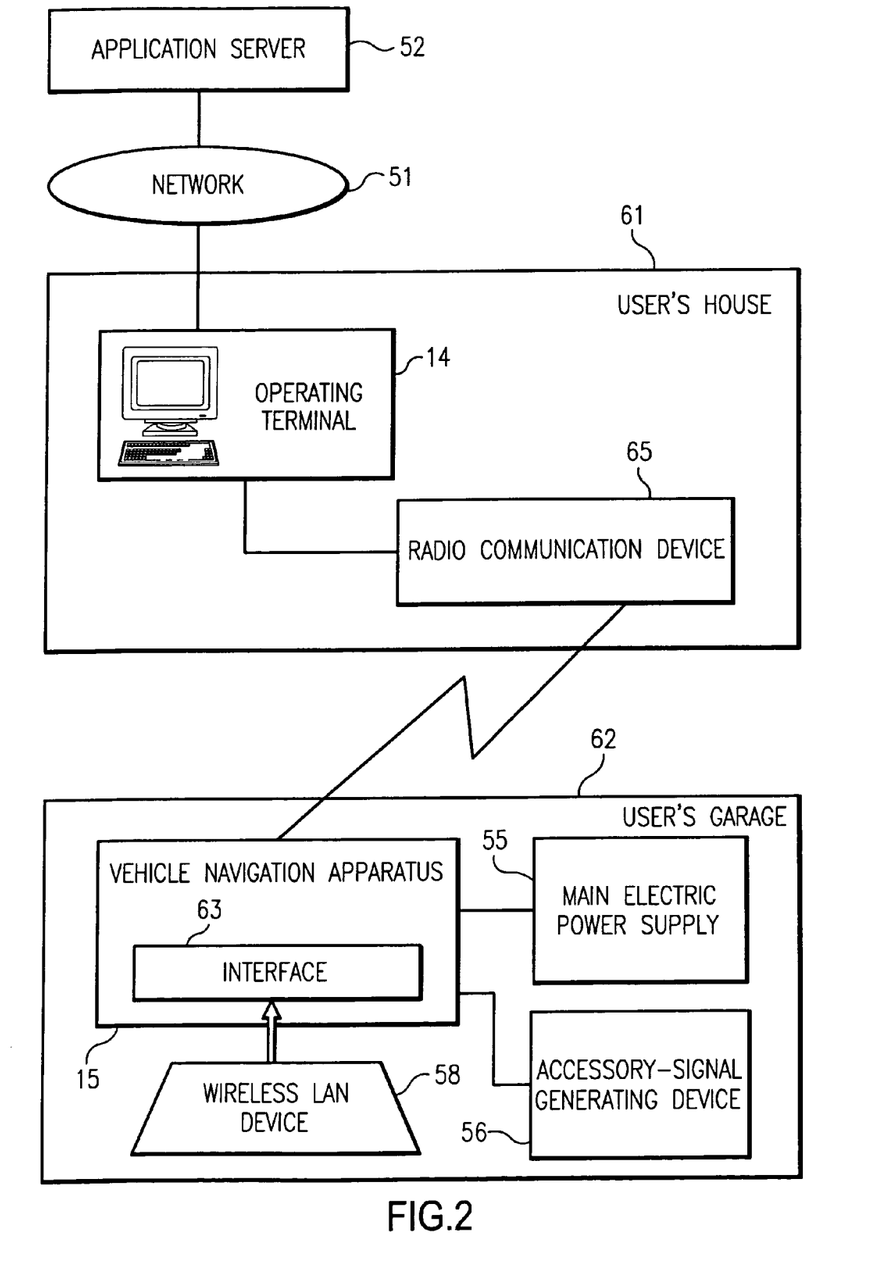
FIG. 2 illustrates composition of a communication system wherein a vehicle navigation apparatus and an operating terminal are communicated with each other according to the first embodiment of the present invention.

FIG. 2 illustrates the composition of a communication system wherein a vehicle navigation apparatus and an operating terminal are communicated with each other according to a first embodiment of the invention.

FIG. 2 shows a vehicle navigation apparatus 15 aboard a passenger vehicle, a truck, a bus, or a motorcycle. A wireless LAN (Local Area Network) device 58 is coupled to an interface 63 in the vehicle navigation apparatus 15. The wireless LAN device 58 is, for example, a wireless LAN card. The interface 63 is, for example, a card slot to which the wireless LAN card is loaded. The wireless LAN device 58 may be preliminarily built in the vehicle navigation apparatus. In the interest of the simplicity, the detailed composition of the vehicle is omitted from FIG. 2. However, there is shown a vehicle battery serving as a main electric power supply 55. The main electric power supply 55 is coupled to the vehicle navigation apparatus 15, so as to supply the vehicle navigation apparatus 15 with electric power. Further there is shown an accessory-signal generating device 56 to generate accessory-signals that could be received by the vehicle navigation apparatus 15. The vehicle navigation apparatus 15 is activated upon receipt of the accessory-signals.

FIG. 2 shows the communication system while the vehicle (not shown) is parked at a user's garage 62 owned by any one of a driver, a fellow passenger, and an owner of the vehicle.

Further, there shown in FIG. 2, a user's house 61, furnished with a radio communication device 65, serving as an access point through which communication with the wireless LAN device 58 is established under a wireless LAN system. Either the user's garage 62 or the user's house 61 furnished with the radio communication device 65 is registered as a registered point with a power management unit 59 (described later). In the registration, the user's garage 62 and the user's house 61 are classified into a category "House."

The radio communication device 65 is, for example, a wireless LAN adaptor by which communication with the vehicle navigation apparatus 15 is established under the wireless LAN system at, for example, an ISM frequency band (2.4 [GHz]), a frequency band (5.2 [GHz]), a quasi-extremely high frequency band (19 [GHz]), or infrared rays. Here, the wireless LAN system can be one of conforming to IEEE standards, for example, IEEE802.11a, IEEE802.11b, IEEE802.11e, or IEEE802.11g. Alternatively, the wireless LAN system can be one of adopting "Bluetooth" the personal home-use radio communication system.

In most cases, the main electric power supply 55 is a vehicle battery. However, the main electric power supply 55 is not limited to such a case. The main electric power supply 55 may be a double-layer electrolytic capacitor, a fuel cell, or the like. Although voltage applied to open terminals on the main electric power supply 55, serving as the vehicle battery, can be any voltage, the description here, for example, assumes a 12v-vehicle battery for a compact car. While the engine is running, the alternator, attached to the engine, can charge the main electric supply 55 with the electric power. The main electric power supply 55 is not supplied with the power from the alternator when the engine is stopped.

Under the ordinary wireless LAN system, in which communication between the wireless LAN device 58 and the radio communication device 65 is established, communication coverage is typically inside a 10 m-radius to 100 m-radius of the radio communication device 65. To communicate with the radio communication device 65, the wireless LAN device 58 should be within the coverage range.

An operating terminal 14 is a kind of a user-operable computer, comprising main operation means, such as a CPU or a MPU; storage means, such as a semiconductor memory or a magnetic disk; display means, such as a liquid crystal display, a LED (Light Emitting Diode) display, or a CRT; input means, such as a keyboard, a joystick, a touch panel, a tablet, a push-button, a rotary dial, or a remote control; and an input/output interface. The operating terminal 14 may be any of the following: a personal computer, a stationary telephone, a portable telephone, a personal handy phone (used in PHS: Personal Handy-Phone System constructed by NTT, or Nippon Telegraph and Telephone Corporation), a PDA (Personal Digital Assistant), an electronic hand-held organizer, a portable information terminal, a game machine, a digital television, or the like. The operating terminal 14 is connected to the radio communication device 65 over a wired line or wirelessly, whereby it may communicate with the vehicle navigation apparatus 15 via the radio communication device 65.

According to the invention, a cellular terminal used in a cellular mobile phone system may be employed in place of the wireless LAN device 58 and the radio communication device 65. Here, the cellular mobile phone system can be any one of the following: a first-generation cellular mobile phone system, a second-generation cellular mobile phone system, a third-generation cellular mobile phone system, IMT-2000, or the like. These systems are generically described as a mobile communication system wherein communication is established through a cellular terminal such as a cellular phone or the personal handy phone for PHS. The cellular terminal may be a mobile phone that uses a prepaid-card. Under the ordinary mobile communication system, the vehicle navigation apparatus 15 and the operating terminal 14 communicate with each other over a general mobile phone network or PHS network. To establish communication between the vehicle navigation apparatus 15 and the operating terminal 14, the cellular terminal should be within the communication coverage of a base station in the cellular phone system.

For communication with the vehicle navigation apparatus 15, the operating terminal 14 is designed to be accessible to a network 51. The network 51 may be, for example, any one of the following communication lines: the Internet, a LAN, a WAN (Wide Area Network), an intranet, a wired/wireless public switched communication line network, a dedicated communication line network, or a certain combined network comprised of the various networks. It is desirable that the user can access a web server, acting as an information provision device that provides various data such as cartographic data, music data, image data, or text data, via the network 51. For such data, it is desirable that the network 51 should support a high-capacity high-speed transmission system. For example, if the network 51 is the Internet, a broadband network with data transfer rates in excess of at least one Mbps (Mega bit per second) is preferable. However, the high-capacity high-speed transmission system is not limited to such a broadband network. Any kind of high-capacity high-speed transmission system or method may be applicable to the invention.

When the operating terminal 14 is accessible to the network 51, the radio communication device 65 serves as a relay between the operating terminal 14 and the vehicle navigation apparatus 15. Alternatively, the radio communication device 65 works as an access point through which the vehicle navigation apparatus 15 is authenticated to the network 51.

FIG. 2 further shows an application server 52 that is accessible from the network. The application server 52 is a kind of computer comprising arithmetic means, such as a CPU or a MPU; storage means, such as a semiconductor memory or a magnetic disk; display means, such as a CRT, a liquid crystal display, or a LED (Light Emitting Diode) display; input means, such as a keyboard, a touch-sensitive panel, a tablet, a push-button, or a mouse; and a input-output interface. The application server 52 may be, for example, a web server on the Internet. However, the application server 52 is not limited to the web server. Rather, it may be a personal computer, a workstation, or any other kind of computer. Furthermore, the application server 52 is not limited to the single computer, but may be a so-called a decentralized server in which a plurality of computers are systematically connected one after the other. Further, the application server 52 may be one of the systems constructed within a mainframe computer. The application server 52 distributes the following data, programs, and software programs: navigational data comprised of the cartographic data, road data, photographic data, and facility data about facilities, such as hotels, service stations, and tourist information centers, all of which are used in the vehicle navigation apparatus 15; update programs for the vehicle navigation apparatus 15; a personal information management software program usable in the vehicle navigation apparatus 15; and application programs such as game software and entertainment software like music data and video data.

When the application server 52 functions to search for a route, retrieve a point or facilities, and the like, it is possible for the operator to input from the operating terminal 14 a departure point and a destination, and define search criteria and retrieval criteria, in order that the application server 52 might carry out the search, retrieval, and the like. The results of the route search and the point or facilities retrieval can be transmitted back to the operating terminal 14.

Data can be downloaded together with the search results and the retrieval results to the apparatus 15 by actuating the operating terminal 14. Here, the data includes the navigational data, the update program, and the application programs such as game software and entertainment software.

If the application server 52 is able to distribute the navigational data, for example, the latest version cartographic data, it is possible for the user to download his or her desired cartographic data from the application server 52 to the operating terminal 14 over the network 51. Furthermore, such cartographic data, downloaded into the operating terminal 14, can be transferred to the vehicle navigation apparatus 15 through the radio communication device 65 and therewith the old cartographic data, having already been stored in the apparatus 15, is updated. Otherwise, the cartographic data can be downloaded directly from the application server 52 to the vehicle navigation apparatus 15 without having to use the operating terminal 14.

If the vehicle navigation apparatus 15 is able to rewrite a startup program, the latest startup program can be downloaded to the vehicle navigation apparatus 15 from the application server 52. If the vehicle navigation apparatus 15 functions as an onboard audio device, the user may edit and compile his or her favorite music by manipulating the operating terminal 14 and then store the compiled music into the vehicle navigation apparatus 15. If the application server 52 distributes music, it is possible for the user to download his or her favorite music from the application server 52 to the operating terminal 14 over the network 51. Furthermore, the music downloaded to the operating terminal 14 can be transferred to the vehicle navigation apparatus 15 through the radio communication device 65, and therewith the music can be downloaded and stored into the vehicle navigation apparatus 15. Otherwise, the music is downloaded directly from the application server 52 to the vehicle navigation apparatus 15 without using the operating terminal 14.

If the vehicle navigation apparatus 15 functions as a playback device that can replay still-frame images or video images, the image data may be stored into the vehicle navigation apparatus 15 just as in the case of storing the music data. Specifically, the still-frame images or the video images taken with a digital camera or a video camera can be transferred from the operational terminal 14 and stored into the vehicle navigation apparatus 15.

Furthermore, if the vehicle navigation apparatus 15 is capable of organizing and displaying a timetable or a schedule, the timetable or schedule organized by using the personal information management software program is transferred from the operating terminal 14 and stored into the vehicle navigation apparatus 15.

Even if the vehicle is parked in a place other than the user's garage 62, it is possible to download data to the vehicle navigation apparatus 15. Here, assume that the vehicle is parked at a parking lot (for example, a parking lot of a commercial facility, such as a department store, a supermarket, or a convenience store; a parking lot of recreational facility, such as an amusement park or a game center; a parking lot of a fast-food restaurant or a coffee shop; a parking lot of public transportation, such as a railroad station or an airport; and a parking lot of a gas station) provided with a wireless communication device similar to the radio communication device 65 that is communicable with the network 51. Here, just as in the case where the vehicle is parked in the user's garage 62, the cartographic data, the music, the video data, or the like can be downloaded from the application server 52 to the vehicle navigation apparatus 15 over the wireless LAN. This allows the user to download his or her desired data to the vehicle navigation apparatus 15 even if he or she is away from home.

Furthermore, if the parking lot is a toll car park, that is provided with the wireless communication device communicable with a central computer that controls the toll car park and compiles data as to both time and charges for parking, such data can be downloaded from the wireless communication device to the vehicle navigation apparatus 15.

If the central computer provides information about the facilities such as a department store or an amusement park located around the toll car park, the facility information may include a map of the facility, information about or a grand sale day or a free gift offered by the facility, business hours of the facility, and an area for special sales within the facility. These pieces of information can be downloaded to the vehicle navigation apparatus 15 over the wireless LAN. Thus, the user may be provided with the information about the various facilities located around the toll car park.

Further, assume that the vehicle is parked in a roadside parking space provided with a wireless communication device like the radio communication device 65 that is communicable with the network 51. Again, just as in the case where the vehicle is parked in the user's garage 62, the cartographic data, the music, the video data, or the like can be downloaded from the application server 52 to the vehicle navigation apparatus 15 over the wireless LAN. This allows the user to download his or her desired data to the vehicle navigation apparatus 15 even if he or she is away from home.

Additionally, assume that the vehicle is parked in a parking lot of the user's office and the parking lot is provided with a wireless communication device like the radio communication device 65 communicable with the network 51. Once again, just as in the case where the vehicle is parked in the user's garage 62, the cartographic data, the music, the video data, or the like can be downloaded from the application server 52 to the vehicle navigation apparatus 15 over the wireless LAN. This allows the user to download his or her desired data to the vehicle navigation apparatus 15 even during his or her working hours.

Figure 3:
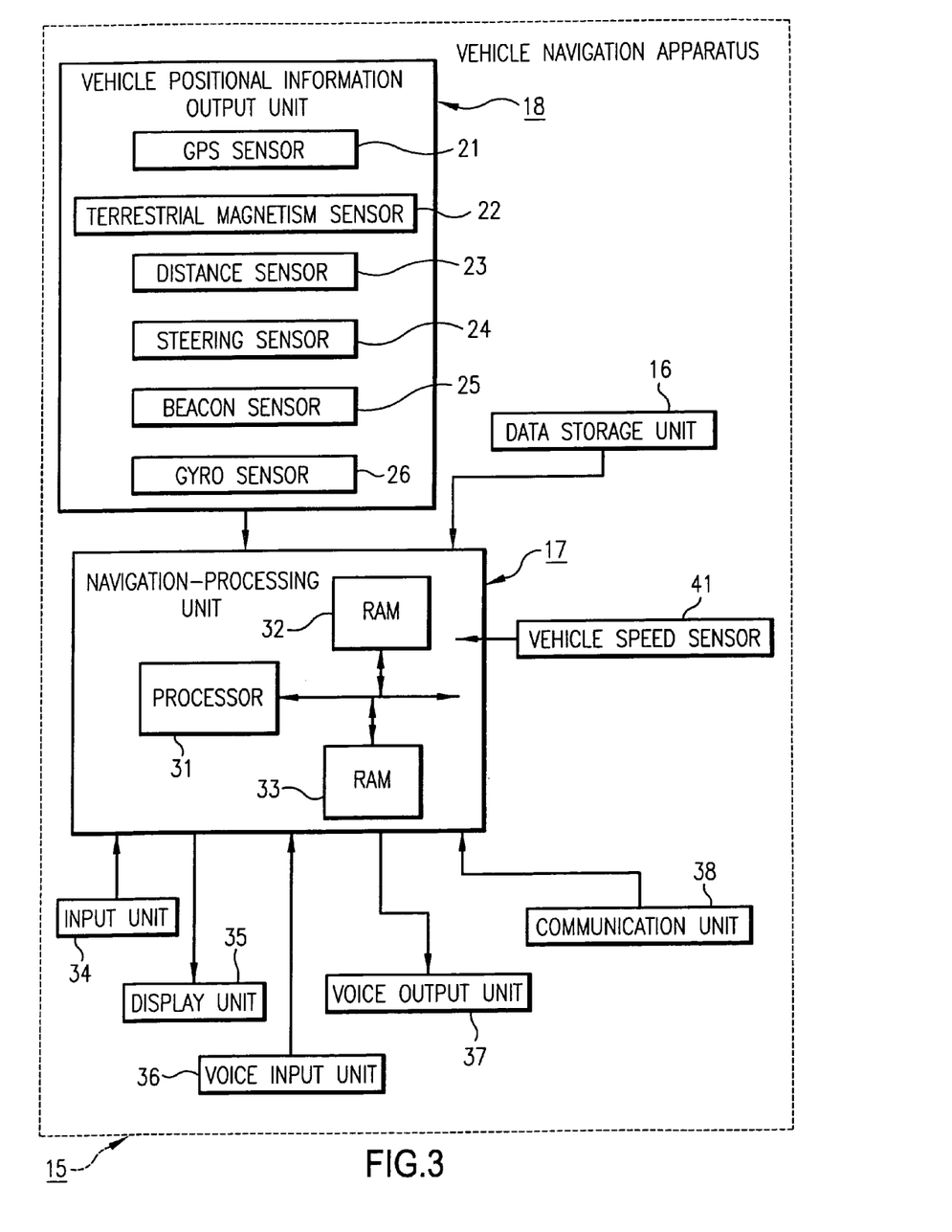
FIG. 3 illustrates composition of a vehicle navigation apparatus serving as an on-board apparatus according to the first embodiment of the present invention.

Next, the composition of the vehicle navigation apparatus 15 according to the first embodiment will be detailed with reference to FIG. 3. FIG. 3 illustrates the vehicle navigation apparatus 15, serving as a kind of computer, comprising a vehicle positional information output unit 18, by which a present position of the vehicle is detected and the positional information of the vehicle is outputted; a data storage unit 16, serving as storage medium on which road data and so on are stored; a navigation-processing unit 17, by which arithmetic processing is carried out based on inputted information; an input unit 34; a display unit 35; a voice input unit 36; a voice output unit 37; and a communication unit 38. Additionally, a vehicle-speed sensor 41 is coupled to the navigation-processing unit 17.

The vehicle positional information output unit 18 comprises a GPS (Global Positioning System) sensor 21, a terrestrial magnetism sensor 22, a distance sensor 23, a steering sensor 24, a beacon sensor 25, a gyro sensor 26, and an altimeter (not shown). As one thinks proper, one or more of these components may be left out from the vehicle positional information output unit 18 in view of production costs.

The GPS sensor 21 detects a present position of the vehicle on the surface of the Earth by receiving radio waves generated by artificial satellites. The terrestrial magnetism sensor 22 detects vehicle bearings by measuring the terrestrial magnetism. The distance sensor 23 detects a distance between one specific position and another position on a road. The distance sensor 23 may be one of measuring a rotational frequency of wheels, whereby a distance is detected. Alternatively, the distance sensor 23 may be one of measuring acceleration of the vehicle so as to detect a distance by integrating twice the measured acceleration.

The steering sensor 24 detects a steering angle. The steering sensor 24 may be, for example, any one of the following sensors fixed to a rotating-part of the wheels: an optical rotational sensor, a rotational resistance sensor, or an angle sensor.

The beacon sensor 25 detects the present position of the vehicle by receiving positional information transmitted from the beacons placed along roads. The gyro sensor 26 detects rotational angular speed (traverse angle) by using a gas-rate gyro, a vibrating gyro, or the like. By integrating the detected rotational angular speed, the vehicle's bearing can be detected.

The present position can be detected by means of the GPS 21 alone or the beacon sensor 25 alone. In other circumstances, the present position may be detected based on a combination of the distance, the vehicle bearing, and the rotational angular speed respectively detected by the distance sensor 23, the terrestrial magnetism sensor 22, and the gyro sensor 26. Furthermore, the present position may be detected based on a combination of the distance and the steering angle respectively detected by the distance sensor 23 and the steering sensor 24.

The data storage unit 16 has a database comprised of the following data files: a cartographic data file, an intersection data file, a node data file, a road data file, a photographic data file, and a facility information data file (information about hotels, service stations, tourist information centers, and so on). Furthermore, the data storage unit 16 contains the following data: data for searching for a route, data for visually providing the operator with route guidance onto the screen in the display unit 35, data for displaying pictures or frame shots of the intersections and/or the routes, data for indicating distance to the next intersection or indicating a direction to be taken at the next intersection, data for displaying various guidance information onto a screen, and the like. Furthermore, the data storage unit 16 contains some data used in outputting predetermined information from the voice output unit 37.

The intersection data file contains intersection data concerning respective intersections. The node data file contains node data concerning node points located along roads. The road data file contains road data concerning respective roads and/or road links. Based on the data in the intersection data file, the node data file, and the road data file, a state of the road is indicated on the screen. The intersection data may include intersection type data that represents the type of the intersection. The intersection type is, for example, an intersection with traffic lights or an intersection without traffic lights. The node data consists of sub-data about road junctions (including intersections and T-square intersections), node points, and node links connecting respective nodes with each other. The node points can represent at least a location of a curve point.

The road data concerns data about the road itself, e.g., width, gradient, cants, elevation, banks, corners, road surface conditions, existence of a center divider (center strip), the number of traffic lanes, a point where the number of the traffic lanes is reduced, a point where the width of the road is narrowed. In the case of the expressways or arterial roads having up-lanes and down-lanes, such up-lanes and down-lanes are separately contained in the road data file, and therewith such expressways or arterial roads are determined to be a two-way road. Specifically, when the expressway in which both the up-lane and the down-lane respectively have more than one lane, such expressway is determined to be a two-way road. In this case, the up-lanes and the down-lanes are separately contained in the road data. As for the corners of the road, it is desirable that the road data should contain detailed data as to a curvature radius of the corner, a corner of the intersection, a corner of a T-square intersection, and an entrance to a corner. Further, the road data may contain the following road attributes: a railroad crossing, an expressway entrance or exit ramp, a tollgate, a climbing lane, and a descent lane, road types (national highways, principal municipal roads, local minor roads, expressways), and the like.

The navigation-processing unit 17, includes: a processor 31, serving as an arithmetic processing means such as a CPU or MPU to control the vehicle navigation apparatus 15 as a whole; a RAM (Random Access Memory) 32, serving as a working memory when the processor 31 processes various data; and a ROM (Read Only Memory) 33, serving as a storage medium for storing navigational programs such as a control program, a program for searching a route to a destination, a program for carrying out route guidance along a route, a program for determining a specific road segment, and a program for retrieving a certain point or a facility. The input unit 34, the display unit 35, the voice input unit 36, the voice output unit 37, and the communication unit 38 are all coupled to the navigation processing unit 17. According to this composition, various navigational processes may be carried out including route searches, guidance along routes, determination of a specific road segment, retrieval of a point, or retrieval of a facility. As one thinks proper, at least one of the input unit 36 and the output unit 37 may be left out from previously described first embodiment in view of production costs.

A computer-readable storage medium, that stores the navigational programs, can be employed in the navigation apparatus in addition to the ROM 33 and may be any one of the following: a magnetic core, a semiconductor memory, a magnetic tape, a magnetic disk, a magnetic drum, a CD-R/RW, an MD (Mini Disk), a DVD-RAM, a DVD-R/RW, an MO (magneto-optical) disk, an IC card, an optical card, a memory card, or any other possible media.

Furthermore, each of the data storage unit 16 and the ROM 33 consists of a magnetic core, a semiconductor memory, and the like. However, each of the data storage unit 16 and the ROM 33 is not limited to such a case. Each of the storage unit 16 and the ROM 33 may be any one of the following: a magnetic tape, a magnetic disk, a magnetic drum, a CD-R/RW, an MD, a DVD-RAM, a DVD-R/RW, an MO disk, an IC card, an optical card, a memory card, or any other possible medium. These storage media may be stationary or user-installable.

According to the first embodiment, the ROM 33 and the data storage unit 16 respectively store the programs and the data. However, the invention is not limited to such a case. Both the programs and the data may be stored together in a single external storage medium. In this case, for example, the programs and the data are read out from the single external storage medium and then written into a flash memory (not shown) in the navigation-processing unit 17. Both the programs and the data in the flash memory can be updated by swapping one external storage medium for another. Based on the programs and data stored in the various storage mediums, the various navigational processing is carried out. The external storage medium may be any one of the following: a magnetic tape, a magnetic disk, a magnetic drum, a CD-R/

RW, an MD, a DVD-RAM, a DVD-RIRW, an MO disk, an IC card, an optical card, a memory card, or any other possible medium.

As shown in FIG. 2, the vehicle navigation apparatus 15 and the operating terminal 14 are connected with each other via the radio communication device 65 so that bi-directional communication can be established between them. As shown in FIG. 2, the communication unit 38 in the vehicle navigation apparatus 15 is provided with a card expansion slot that serves as the interface 63 for this bi-directional communication. In such case, a wireless LAN card (not shown) serving as the wireless LAN device 58 could be loaded to the communication unit 38. The communication unit 38 and the radio communication device 65 are communicated with each other via the wireless LAN card. Furthermore, the communication unit 38 can include an information sensor (not shown). By means of the information sensor, the communication unit 38 can receive various data, for example, traffic information such as traffic congestion information, traffic accidents information, and D-GPS information to be used in finding an error in detection by the GPS 21. Moreover, according to a second embodiment (described later), the communication unit 38 may be provided with a specific low-power radio communication device (not shown).

According to the first embodiment, when the data distributed from the application server 52 is received in the communication unit 38, such received data is downloaded onto the storage medium, for example, a readable/writable memory such as the RAM 32, the flash memory, or a hard disk in the vehicle navigation apparatus 15. Otherwise, according to the first embodiment, the data distributed from the application server 52 may be downloaded to the operating terminal 14 (shown in FIG. 2), and then that data is transferred from the operating terminal 14 and stored onto the storage medium in the vehicle navigation apparatus 15.

Returning to FIG. 3, the input unit 34 comprises, for example, an operation key, a push-button, a rotary-dial button, and/or a cross-key, each of which are located on the body of the vehicle navigation apparatus 15. Alternatively, the input unit 34 may be a remote control unit. With the operation of keys or buttons, a position on departure is calibrated and a facility or destination is input. If the display unit 35 is a touch-sensitive panel, it is desirable that the input unit 34 should take the displayable form including operation switches, such as the operation keys or operation menus. Therefore, input can be done at the touch of those switches on the touch-sensitive panel.

The screen in the display unit 35 displays operation guidance, operation menus, operation keys explanation, a searched route from a present position to the destination, and guidance information along the searched route. The display unit 35 may be, for example, a CRT display, a liquid crystal display, a LED display, or a plasma display. Alternatively, the display unit 35 may be one of using a hologram device that projects a hologram onto a windshield of the vehicle.

The voice input unit 36, from which necessary information is inputted by voice comprises a microphone and related structure (not shown). The voice output unit 37 includes a voice synthesizer and a speaker (both not shown) and outputs synthesized voice information from the speaker to the operator. Here, the synthesized voice information includes the guidance information, speed-change information, and other navigation related information. The speaker outputs not only the synthesized voices but also various sounds including any guidance-related information prerecorded on a tape or a memory.

Hereinafter, a power management system for a communication device according to embodiments of the invention will be described.

Figure 1:
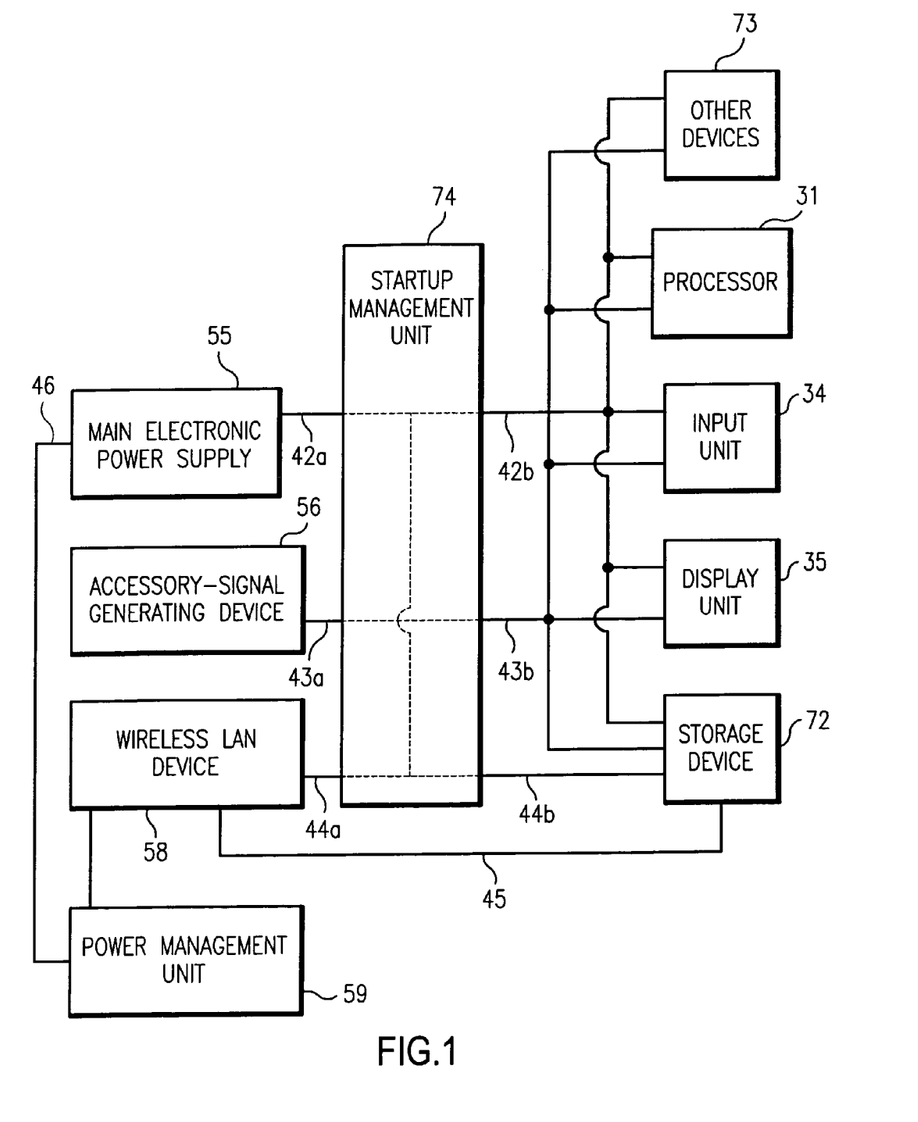
FIG. 1 illustrates composition of a power management system for a communication device according to a first embodiment of the present invention.

FIG. 1 shows the composition of the power management system for a communication device, focusing on activation control of each device in the vehicle navigation apparatus 15 under the power management system. FIG. 1 shows a startup management unit 74 serving as a gate circuit that controls the activation of each device in the vehicle navigation apparatus 15. The startup management unit 74 further carries out a voltage transformation process in which voltage of the electric power supplied from the main electronic power supply 55 is transformed. As a result, each device in the vehicle navigation apparatus 15 is provided with such voltage-transformed electric power.

Further, FIG. 1 shows a storage device 72 working as a data-receipt processing device in which the data downloaded to the vehicle navigation apparatus 15 is stored. According to the first embodiment, the storage device 72 may be a hard disk including the magnetic disks, a DRAM (Dynamic Random Access Memory), a flash memory, or the like. Other devices 73 represent the components, except the processor 31, the input unit 34, the display unit 35, and the storage device 72, in the vehicle navigation apparatus 15.

FIG. 1 shows a power input line 42a along which the electric power flows from the main electronic power supply 55 into the startup management unit 74 and a power output line 42b along which the voltage-transformed electric power flows from the startup management unit 74 into each of the processor 31, the input unit 34, the display unit 35, the storage device 72, and the other devices 73. Further, FIG. 1 shows an accessory-signal input line 43a along which accessory-signals are transmitted from an accessory-signal generating device 56 to the startup management unit 74, and an accessory-signal output line 43b along which the accessory-signals are transmitted from the startup management unit 74 to each of the processor 31, the input unit 34, the display unit 35, the storage device 72, and the other devices 73. Furthermore, FIG. 1 shows a communication-signal input line 44a along which in-communication signals are transmitted from the wireless LAN device 58 to the startup management unit 74, as well as a startup-signal output line 44b along which the startup-signals are transmitted from the startup management unit 74 to the storage device 72. Moreover, FIG. 1 shows a data line 45 and an electric power input line 46. Data sent from the radio communication device 65 to the wireless LAN device 58 is transmitted along the data line 45 to the storage device 72. The electric power flows from the main electronic power supply 55 to a power management unit 59 along the electric power input line 46.

According to the first embodiment, a voltage of about 12 volts, sent along the power input line 42a from the main electronic power supply 55, and the startup management unit 74, is transformed to, for example, a voltage of about 5 volts suited for operating each of the processor 31, the input unit 34, the display unit 35, the storage device 72, and the other devices 73. The transformed voltage is sent along the power output line 42b into each of the processor 31, the input unit 34, the display unit 35, the storage device 72, and the other devices 73.

The accessory-signal generating device 56, installed in the vehicle, is designed to generate accessory-signals when switched on by the user. Usually, a switch of the accessory-signal generating device 56 is integrated with an engine switch of the vehicle. Therefore, when the user switches on the accessory-signal generating device 56, the engine is started. If need be, the accessory-signal generating device 56 is designed to be switched on separately from the engine. Once switched on, the accessory-signal generating device 56 starts to generate the accessory-signals. The startup management unit 74, receiving the accessory-signals transmitted along the line 43a, determines that the startup-signals for activating the vehicle navigation apparatus 15 are inputted. Upon this determination, the startup management unit 74 starts to transmit the accessory-signals along the accessory-signal output line 43b to each of the processor 31, the input unit 34, the display unit 35, the storage device 72, and the other devices 73.

In detail, the accessory-signals are direct current, e.g., a constant voltage of about 5 volts. All of the processor 31, the input unit 34, the display unit 35, the storage device 72, and the other devices 73 are activated only when the electric power flows along the power output line 42b from the startup management unit 74 into them. At the same time, the accessory-signals are transmitted along the accessory-signal output line 43b. All of the processor 31, the input unit 34, the display unit 35, the storage device 72, and the other devices 73 are deactivated when either the flow of the electric power or the transmission of the accessory-signal into them is interrupted.

The wireless LAN device 58 is under control of the power management unit 59. Thereby, the wireless LAN device 58 can be activated whether the accessory-signal generating device 56 is on or off. For example, take a case where the wireless LAN device 58 is a wireless LAN card. In this case, the wireless LAN card being inserted to the interface 63 is automatically activated. The wireless LAN device 58 is switched into an intermittent deactivated state when the accessory-signal generating device 56 is off. Under the intermittent standby state, even if there is no communication with the radio communication device 65, the wireless LAN device 58 can be intermittently activated in order to receive the signals generated by the radio communication device 65. That is, the wireless LAN device 58 is activated and deactivated cyclically under the intermittent standby state. If the wireless LAN device 58 does not receive the signals from the radio communication device 65 during a predetermined activation time, for example, about a half of a second, the device 58 is switched into the deactivated state for a predetermined time, for example, about a half of a second. Therefore, the wireless LAN device 58 is activated and deactivated at a certain intermittent intervals. Intermittent activation will lead to the reduction of power consumption. The intermittent intervals, i.e., activation and deactivation time of the wireless LAN device 58, can be varied at the user's discretion. For example, the intermittent intervals can be set from 0.5-second intervals to 5-second intervals.

If the wireless LAN device 58 receives signals from the radio communication device 65 during the activation time, the wireless LAN device 58 is switched from the intermittent standby state to a continuous activation state. Under the continuous activation state, the wireless LAN device 58 is continuously activated so as to communicate with the radio communication device 65. Upon being activated, the wireless LAN device 58 transmits the in-communication signals along the communication-signal input line 44a to the startup management unit 74 indicating the in-communication signals indicate that the LAN device 58 is being activated upon receipt of the signals from the radio communication device 65.

For the convenience of explanation of the first embodiment, the description takes a case where the wireless LAN device 58 is a wireless LAN card. When the accessory-signal generating device 56 is off, the supply of the electric power to the wireless LAN device 58 is controlled by means of the power management unit 59. In other words, the power management unit 59 is designed to supply the wireless LAN device 58 with electric power if the wireless device 58 is in a communication-ready state and the accessory-signal generating device 56 is switched off. Here, the communication-ready state is brought about when there exists the radio communication device 65 (serving as an access point) through which communication with the wireless LAN device 58 is established.

Authentication of the wireless LAN device 58 is performed at the radio communication device 65. To begin the authentication process, the wireless LAN device 58 searches for the radio communication device 65 serving as the access point. Then, a determination is made whether the wireless LAN device 58 is in a communication-ready state so as to communicate with the radio communication device 65. If it is determined that the wireless LAN device 58 is in the communication-ready state, the power management unit 59 starts to supply the wireless LAN device 58 with electric power. For example, there is a case where the vehicle is parked at a location provided with the radio communication device 65 serving as the access point (e.g., the user's garage 62; a parking lot of the user's office; a parking lot of a commercial facility, such as a department store, a supermarket, or a convenience store; a parking lot of a recreational facility, such as an amusement park or a game center; a parking lot of a fast-food restaurant or a coffee shop; a parking lot located around public transportation, such as a railroad station or an airport; and a gas station). In such case, the power management unit 59 is allowed to supply the wireless LAN device 58 with the electric power because the radio communication device 65 is communicable with the wireless LAN device 58.

Furthermore, the power management unit 59 may measure the volume of communication traffic that flows between the wireless LAN devices 58 and the radio communication device 65. For example, where communication is made between one radio communication device 65 and a plurality of the wireless LAN devices 58, the intensity of the communication traffic between the wireless LAN devices 58 and the radio communication device 65 increases to such an extent that the traffic cannot virtually cover high-volume data. The power management unit 59 is designed to be able to measure the volume of the communication traffic and determine whether the measured volume falls within a predetermined volume, i.e., whether the traffic can cover a predetermined volume of data. Such a determination is made when the accessory-signal generating device 56 is switched off. When it is determined that the measured volume falls within the predetermined volume, the power management unit 59 supplies the wireless LAN device 58 with the electric power.

Further, the power management unit 59 may be one of having a user authentication function. To be authenticated, the user should be registered with the power management unit 59. Specifically, the registration is conducted by inputting authentication codes such as a name, passwords, personal identification numbers, or the like from the input unit 34. When the accessory-signal generating device 56 is switched off, the display unit 35 shows the user a message to input the authentication codes. Alternatively, this message can be delivered to the user by voice from the voice output unit 37. Upon input of the authentication codes (name, password, personal identification number, and the like), the power management unit 59 performs the user authentication by checking the inputted authentication codes against the already-registered authentication codes. When the user is authenticated and validated as an eligible user, the power management unit 59 starts to supply the wireless LAN device 58 with electric power. On the contrary, if the authentication does not confirm the identity of the user, the unit 59 does not supply the wireless LAN device 58 with electric power. However, the user authentication is not limited to previously-described case. The user authentication can be performed according to a biometric method in which statistical analysis of biological data about the user is conducted. To use the biometric method in the user authentication, the biological data about the user, for example, fingerprints, voiceprints, iris patterns, facial features, or the like, should be registered with the power management unit 59 in advance. Upon input of the user's biological data, an authentication device such as a fingerprint ID system performs the user authentication by checking the inputted biological data against already-registered biological data about the registered user. Thus, the power management unit 59, having the user authentication function, ensures against unauthorized access under an assumed name thereby preventing data leakage.

Upon receipt of the signals from the radio communication device 65, the wireless LAN device 58 is switched from the intermittent standby state to the continuous activation state. Under the continuous activation state, the wireless LAN device 58 can continuously communicate with the radio communication device 65 and transmit the in-communication signals to the startup management unit 74. The startup management unit 74 receiving the in-communication signals transmitted along the communication-signal input line 44a determines that the received in-communication signals are startup-signals for activating the vehicle navigation apparatus 15. Upon this determination, the startup management unit 74 starts to transmit the startup-signals along the startup-signal output line 44b to the storage device 72. In detail, the startup-signals, similar to the accessory-signals, are direct current, e.g., a constant voltage of predetermined volts. Such startup-signals are generated based on the electric power that flows along the startup-signal output line 44b from the main electronic power supply 55, and transformed through the startup management unit 74.

Because the startup-signals are similar to the accessory-signals, just as in the case where the device 72 receives accessory-signals transmitted along the accessory-signal output line 43b, the storage device 72 can also be activated upon the receipt of the startup-signals transmitted along the startup-signal output line 44b. Because of the similarity between the accessory-signals and the startup-signals, input terminals on the startup-signal output line 44b to the device 72 and input terminals on the accessory-signal output line 43b to the device 72 are practically combined with each other. Therefore, the storage device 72 is activated upon receipt of either the accessory-signals or the startup-signals on the condition the electric power flows from the startup management unit 74 along the power input line 42b.

While the storage device 72 is activated, data sent from the radio communication device 65 to the wireless LAN device 58 is transmitted to the storage device 72 through the data line 45 and stored into the storage device 72. In the first embodiment, it is desirable that the storage device 72 should work on a standalone basis, like a DRAM, a flash memory, or a hard disk that has a special processor workable independent of the working of processor 31.

However, though less desirable, the storage device 72 may be a processor-dependent hard disk, i.e., a hard disk controlled by the processor 31. In this case, the processor 31 serves as a data-receipt processing device for data received from the wireless LAN device 58, and therefore the startup management unit 74 supplies the processor 31 with the startup-signals upon receipt of the startup-signals from the wireless LAN device 58 along the communication-signal input line 44a.

Therefore, even if the accessory-signal generating device 56 is switched off while the vehicle is parked in the user's garage 62, it is possible to download the data distributed from the application server 52 to the vehicle navigation apparatus 15 and to store such downloaded data into the storage device 72. Furthermore, according to the invention, only the wireless LAN device 58 is activated until the download process is started. This leads to the reduction of power consumption and the prevention of a discharge of the electric power from the main electronic power supply 55.

Still further, the wireless LAN device 58 in the intermittent standby state will facilitate the reduction of power consumption. Even when the download process is started, the power consumption will be reduced because only the storage device 72, or only both the storage device 72 and the processor 31, are activated. This will also lead to the reduction of power consumption as well as the prevention of a wasteful discharge of the electric power from the main electronic power supply 55.

The flow of electric power to the wireless LAN device 58 in the intermittent standby state is under the control of the power management unit 59. Under the control of the power management unit 59, the electric power flows into the wireless LAN device 58 only when the wireless LAN device 58 is in the communication-ready state. That is, the power management unit 59 can control the power consumption of the wireless LAN device 58 to a moderate level. This will result in the reduction of power consumption of the wireless LAN device 58.

Figure 4:
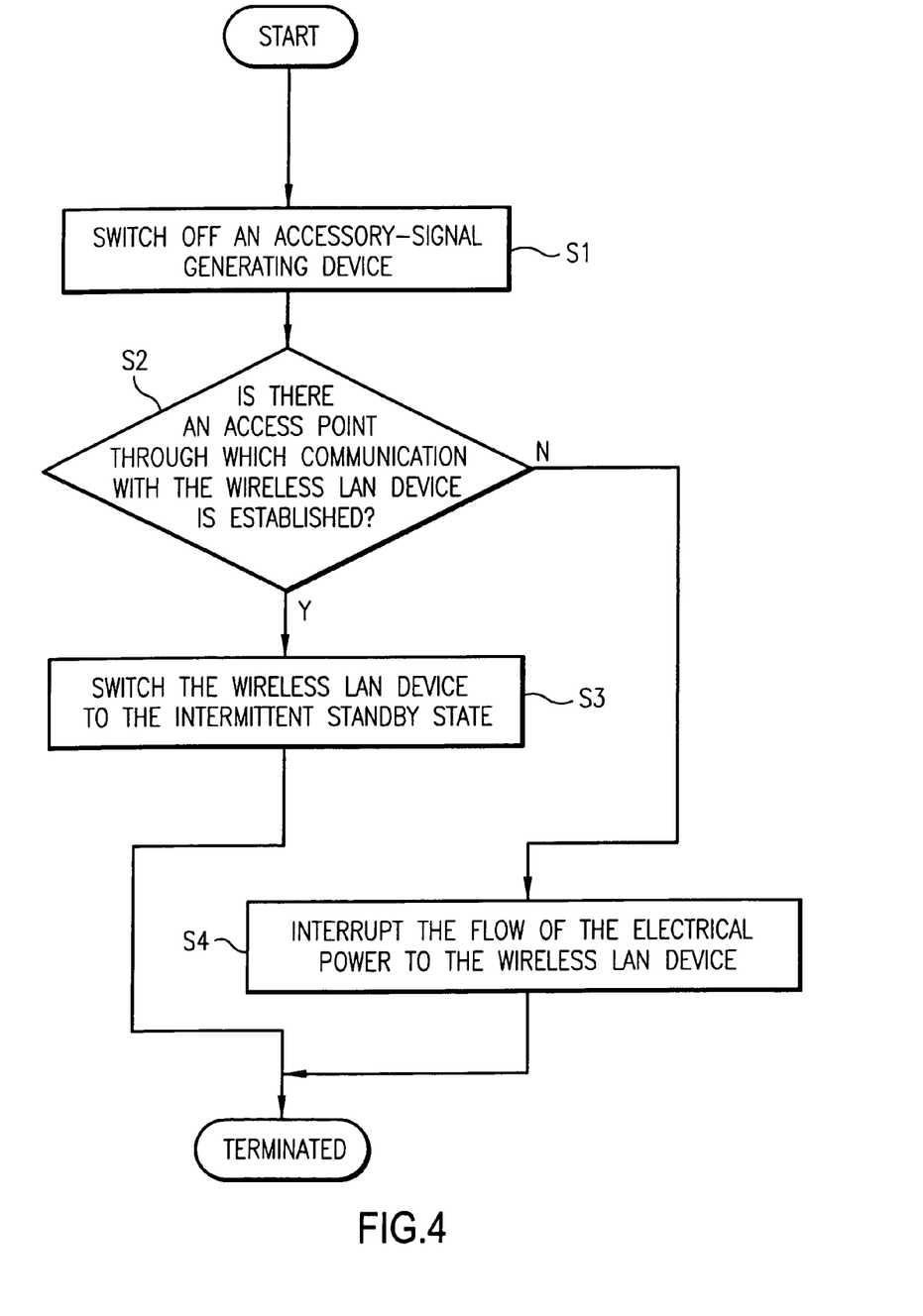
FIG. 4 is a flowchart showing the operation of a power management system for the communication device having no function of user-authentication, according to the first embodiment of the present invention.
Figure 5:
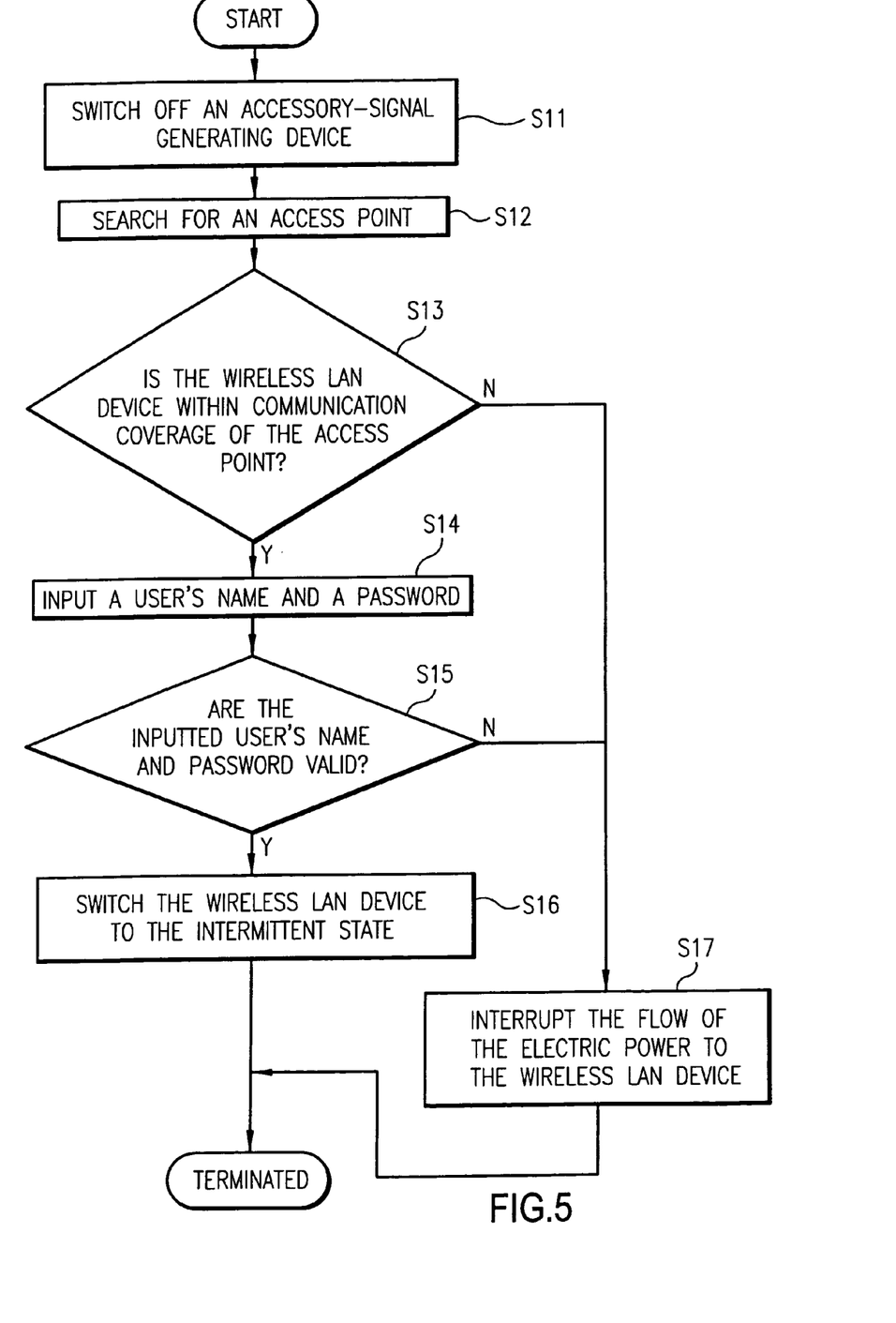
FIG. 5 is a flowchart showing the operation of a power management system for the communication device having a function of user-authentication, according to the first embodiment of the present invention.

Next, the operation of the power management system for a communication device with previously-described composition will be detailed with reference to FIG. 4 and FIG. 5, wherein FIG. 4 is a flowchart showing the operation of a power management system for a communication device having no user authentication function, according to the first embodiment of the invention, and FIG. 5 is a flowchart showing the operation of a power management system for a communication device having a user authentication function, according to the first embodiment of the invention. When the vehicle navigation apparatus 15 is activated as a result of the accessory-signal generating device 56 being switched on, electric power flows from the main electronic power supply 55 in order to activate the wireless LAN device 58.

Upon detection of the accessory-signal generating device 56 being switched off, the power management unit 59 determines whether the wireless LAN device 58 is in the communication-ready state. Specifically, just before the accessory-signal generating device 56 turns off, the power management unit 59 instantaneously determines whether an access point exists through which communication with the wireless LAN device 58 is established.

If it is determined that the wireless LAN device 58 is in the communication-ready state, the power management unit 59 starts to supply the wireless LAN device 58 with the electric power. Then, the wireless LAN device 58 is switched into the intermittent standby state so as to receive the signals from the radio communication device 65. On the contrary, if it is determined that the wireless LAN device 58 is not in the communication-ready state, the power management unit 59 interrupts the flow of the electric power to the wireless LAN device 58 and thereby the wireless LAN device 58 is deactivated.

The flowchart in FIG. 4 explains the operation of the power management unit 59 having no user authentication function.

In step S1, an accessory-signal generating device 56 is switched off. Then, in step S2, it is determined whether there exists an access point through which communication with the wireless LAN device 58 is established. If the access point exists, operation of the flowchart continues to step S3. Otherwise, if the access point does not exist, operation jumps to step S4.

In step S3, the wireless LAN device 58 is switched to the intermittent standby state, and operation of the flowchart terminates. Conversely, in step S4, the flow of electric power to the wireless LAN device 58 is interrupted and operation of the flowchart terminates.

FIG. 5 is a flowchart explaining the operation of a power management system for the communication device having a user authentication function, according to the first embodiment of the invention. Here, for simplicity of explanation, the same operations described in FIG. 4 are not described. Therefore, only the operations after the power management unit 59 instantaneously determines whether there exists the radio communication device 65, serving as the access point through which communication with the wireless LAN device 58 is established, are described. When the power management unit has a user authentication function, if it is determined that the wireless LAN device 58 is not in the communication-ready state (communication between the wireless LAN device 58 and the radio communication device 65 is not established), the power management unit 59 interrupts the flow of the electric power to the wireless LAN device 58 and thereby the wireless LAN device 58 is deactivated. However, if it is determined that the wireless LAN device 58 is in the communication-ready state (communication between the wireless LAN device 58 and the radio communication 65 is established), the display unit 35 shows the user a message to input the authentication codes, i.e., user's name and passwords, from the input unit 34.

Upon the user's input of the authentication codes, the power management unit 59 performs the user authentication by checking the inputted authentication codes against the already-registered authentication codes. If the input codes match the already-registered codes, the user is authenticated and validated as an eligible user and the power management unit 59 starts to supply the wireless LAN device 58 with electric power. Then, the wireless LAN device 58 is switched into the intermittent standby state so as to receive the signals from the radio communication device 65. On the contrary, if the authentication does not confirm the identity of the user, the power management unit 59 interrupts the flow of the electric power to the wireless LAN device 58 and thereby the wireless LAN device 58 is deactivated.

The flowchart in FIG. 5 explains working of the power management unit 59 having a user-authentication function. In step S11, an accessory-signal generating device 56 is switched off. Then, in step S12, an access point is searched for. Next, in step S13, it is determined whether the wireless LAN device 58 is within communication coverage of the access point. If the wireless LAN device 58 is within the communication coverage of the access point, operation of the flowchart continues to step S14. However, if the wireless LAN device 58 is not within the communication coverage of the access point, operation jumps to step S17.

In step S14, a user's name and a password (authentication codes) are input. Then, in step S15, it is determined whether the input user's name and password are valid. If it is determined that the input user's name and password are valid, operation of the flowchart continues to step S16. However, if it is determined that the input user's name and password are invalid, operation jumps to step S17.

In step S16, the wireless LAN device 58 is switched to the intermittent standby state, and the operation of the flowchart terminates. In step S17, the flow of the electric power to the wireless LAN device 58 is interrupted, and the operation of the flowchart terminates.

According to the first embodiment, when the accessory-signal generating device 56 is switched off, the power management unit 59 determines whether there exists an access point through which communication with the wireless LAN device 58, serving as the communication device, is established. If there is no such access point, the power management unit 59 interrupts the flow of electric power to the wireless LAN device 58 and thereby the wireless LAN device 58 is deactivated. As a result, the wireless LAN device 58 is not activated unnecessarily. This leads to the prevention of a wasteful discharge of electric power from the main electronic power supply 55.

Alternatively, the communication device may be a cellular terminal rather than the wireless LAN device 58. In this case, the cellular terminal is intermittently activated in an intermittent standby state, such that communication with the base station is made on an intermittent basis. While near the base station, such intermittent-basis communication is very helpful for continually determining the position of the cellular terminal, i.e., the communication device. In detail, the base station regularly checks where in the communication coverage of the base station the cellular terminal is located. Usually, the communication coverage of a base station for a cellular phone has a range of at least 1.5 km to several kilometers. The communication coverage of the base station for the mobile phones used in PHS (Personal Handy Phone system) has a range of at least 100 m to several hundreds of meters.

Figure 6:
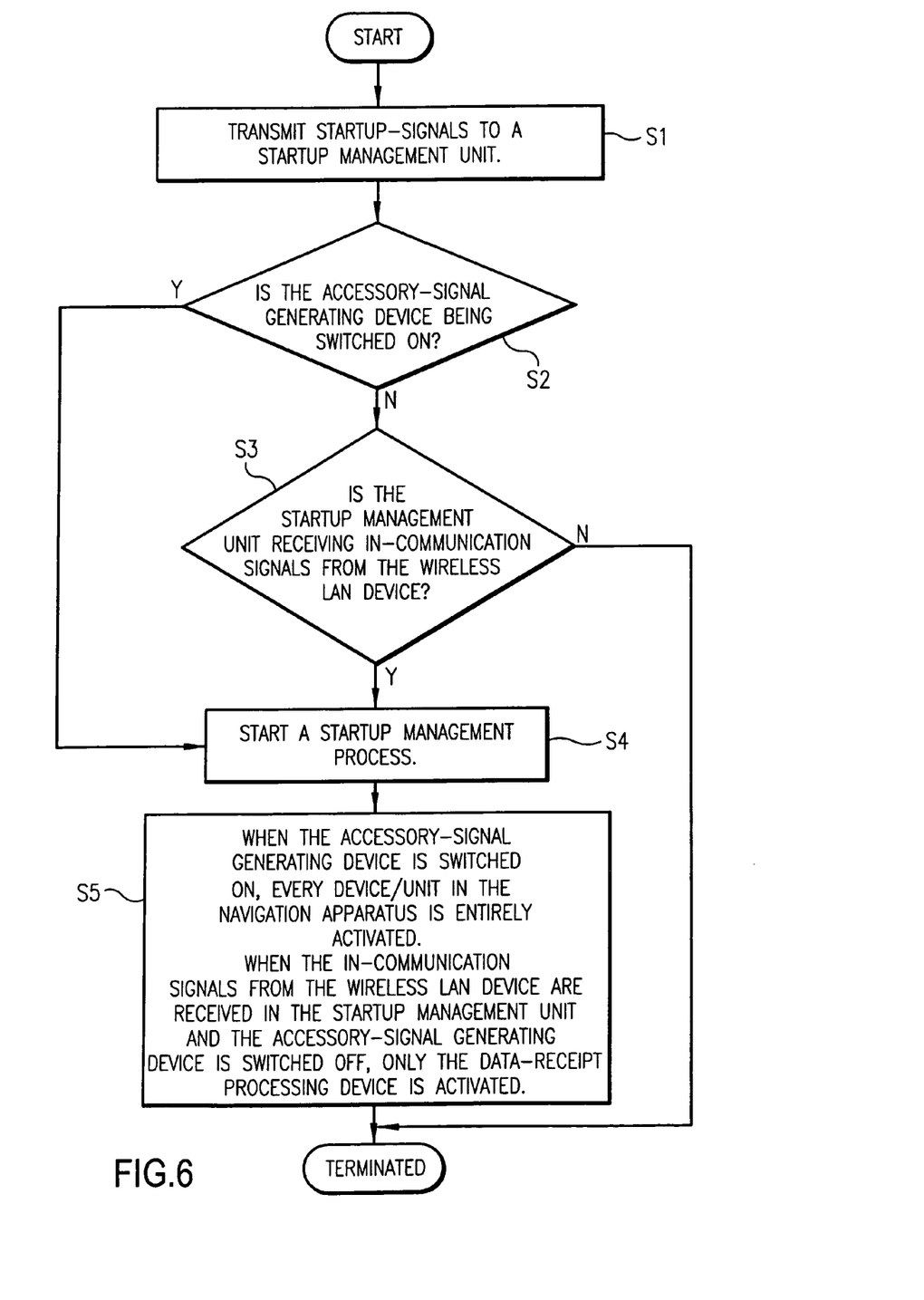
FIG. 6 is a flowchart showing process of the startup management according to the first embodiment of the present invention.

FIG. 6 is a flowchart showing the process of startup management according to the first embodiment of the invention. Referring to FIG. 6, the description focuses on a process through which the vehicle navigation apparatus 15 is activated so as to download data via the operating terminal 14 when the vehicle is parked at the user's garage 62.

At the beginning of the process, upon receipt of the startup-signals to activate the vehicle navigation apparatus 15, the startup management unit 74 determines whether the accessory-signal generating device 56 is switched on or off. When the accessory-signals are not being transmitted to the startup management unit 74, along the accessory-signal input line 43a, it is determined that accessory-signal generating device 56 is switched off. When the accessory-signals are being transmitted to the startup management unit 74 along the accessory-signal input line 43, it is determined that device 56 is switched on. If the accessory-signal generating device 56 is determined to be switched on, the startup management unit 74 starts the startup management process.

If the accessory-signal generating device 56 is determined to be switched off, the startup management unit 74 then determines whether in-communication signals are received along the communication-signal input line 44a from the wireless LAN device 58. If it is determined that the in-communication signals from the wireless LAN device 58 are received in the startup management unit 74, the startup management unit 74 starts the startup management process. If it is determined that the in-communication signals from the wireless LAN device 58 are not received in the startup management unit 74, the startup management unit 74 abandons the startup management process.

In the startup management process (when the accessory-signals are being transmitted to the startup management unit 74 along the accessory-signal input line 43a such that the device 56 is determined to be switched on), the startup management unit 74 transmits the accessory signals along the accessory-signal output line 43b to each of the processor 31, the input unit 34, the display unit 35, the storage device 72, and the other devices 73. Thereby, every device and unit in the vehicle navigation apparatus 15 is entirely activated.

When it is determined that the in-communication signals from the wireless LAN device 58 are received in the startup management unit 74 and the accessory-signal generating device 56 is determined to be switched off, the startup management unit 74 transmits the startup-signals along the startup-signal output line 44b only to the data-receipt processing device, i.e., only the storage device 72, otherwise, only the storage device 72 and the processor 31. Thereby, only the data-receipt processing device (the storage device 72, otherwise, only the storage device 72 and the processor 31) is activated. In this case, any other devices or units except the data-receipt processing device are not activated. This will result in the reduction of power consumption as well as the prevention of the wasteful discharge of the electric power from the main electronic power supply 55.

Next, the flowchart in FIG. 6 will be described in detail. In step S1, startup-signals are transmitted to the startup management unit 74. Then, in step S2, it is determined whether the accessory-signal generating device 56 is being switched on. If it is determined that the accessory-signal generating device 56 is on, then operation of the flowchart continues to step S4. However, if it is determined that the accessory-signal generating device 56 is off, operation jumps to step S3.

In step S3, it is determined whether the startup management unit 74 receives the in-communication signals from the wireless LAN device 58. If it is determined that the in-communication signals are received in the startup management unit 74, operation of the flowchart continues to step S4. However, if it is determined that no in-communication signals are received in the startup management unit 74, the startup management process is abandoned, and the operation of the flowchart is terminated.

In step S4, a startup management process is started. Thus, in step S5, when the accessory-signal generating device 56 is determined to be switched on, every device and unit in the vehicle navigation apparatus 15 is entirely activated. When it is determined that the accessory-signal generating device 56 is switched off and in-communication signals from the wireless LAN device 58 are received in the startup management unit 74, only the data-receipt processing device is activated.

According to the first embodiment, the startup management unit 74 is designed to serve as a gate circuit and perform the startup management process, thereby controlling the activation of each device and unit in the vehicle navigation apparatus 15. Further, the startup management unit 74 is designed to carry out a voltage transformation process in which the voltage of electric power sent from the main electronic power supply 55 is transformed and transmitted to each device and unit. With the voltage transformation process, the startup-signals, to selectively activate each device and unit in the vehicle navigation apparatus 15, can be generated. In spite of its simple construction, the startup management unit 74 alone can selectively startup each device and unit in the vehicle navigation apparatus 15 without having to use additional control devices. Moreover, the startup management unit 74 is designed to activate only the data-receipt processing device when receiving the in-communication signals from the wireless LAN device 58. Such selective activation minimizes the power consumption by the system, reducing a wasteful discharge of the electric power supplied from a vehicle battery 55.

Even if the accessory-signal generating device 56 is off while the vehicle is parked in the user's garage 62, the data distributed from the application server 52 can be downloaded to the vehicle navigation apparatus 15 and stored into the storage device 72. In this case, according to the invention, only the wireless LAN device 58, serving as the communication device, is activated until the download process is started. This leads to the reduction of power consumption as well as the prevention of a wasteful discharge of the electric power from the main electronic power supply 55. This is in addition to the fact that the wireless LAN device 58 in the intermittent standby state is already contributing to the reduction of power consumption.

Hereinafter, a second embodiment of the invention will be described. In the interest of the simplicity of explanation, the same compositions according to the first embodiment are not described. Furthermore, the reference numerals used in the description of the first embodiment are given for the same components described in the second embodiment.

Figure 7:
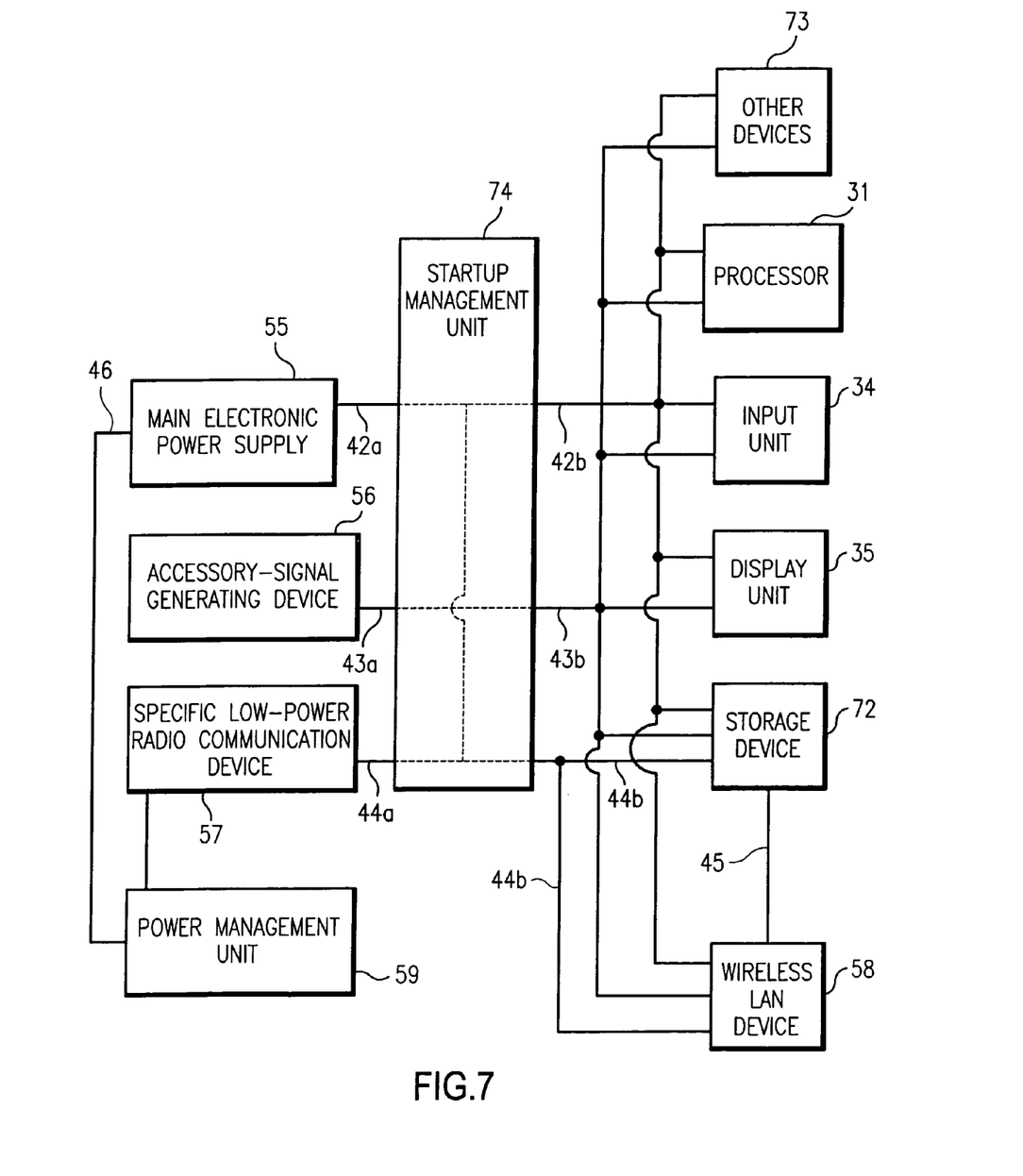
FIG. 7 illustrates composition of a power management system for a communication device according to a second embodiment of the present invention.

FIG. 7 illustrates the composition of a power management system for a communication device according to a second embodiment of the present invention.

The power management system for the communication device according to the second embodiment includes; a wireless LAN device 58, serving as a first communication device, and a specific low-power radio communication device 57, serving as a second communication device. The specific low-power radio communication device 57 is the second communication device that receives certain signals from a specific low-power radio transmitter, such as a remote control unit, to unlock doors of the vehicle, to start an engine of the vehicle, or to set a warning system installed in the vehicle. Each of the power output line 42b, the accessory-signal output line 43b, and the startup-signal output line 44b are connected to the wireless LAN device 58, in order that the wireless LAN device 58 can receive in-communication signals sent from the specific low-power radio communication device 57 to the startup management unit 74 along the communication-signal input line 44a.

It is desirable that the operating terminal 14 (shown in FIG. 2) should be connectable to a specific low-power radio transmitter (not shown), thereby allowing communication with the vehicle navigation apparatus 15 under a specific low-power radio communication system. Under the specific low-power radio communication system, the startup-signals are transmitted, by the operation of the operating terminal 14, through the specific low-power radio transmitter to the specific low-power radio communication device 57 in the vehicle navigation apparatus 15. This enables the wireless LAN device 58 to communicate with the radio communication device 65 under the wireless LAN system. Here, the low-power radio transmitter may be in the form of, for example, a remote control unit operable on a stand-alone basis.

When the accessory-signal generating device 56 is switched on and the vehicle navigation apparatus 15 is activated, the wireless LAN device 58 is activated based on both the electric power from a main electronic power supply 55 and the accessory-signals transmitted accessory-generating device 56.

Upon detection of the accessory-signal generating device 56 being switched off, the power management unit 59 determines whether the wireless LAN device 58 is in a communication-ready state. In detail, just before the accessory-signal generating device 56 turns off, the power management unit 59 instantaneously determines whether there exists the access point through which communication with the wireless LAN device 58 is established. Here, under the wireless LAN system, as far as being activated, the wireless LAN card is designed to search for the access point through which communication can be established.

If it is determined that the wireless LAN device 58 is in a communication-ready state, the power management unit 59 starts to supply the specific low-power radio communication device 57 with electric power. Then, the specific low-power radio communication device 57 is switched into the intermittent standby state so as to receive the signals from the radio communication device 65. On the contrary, if it is determined that the wireless LAN device 58 is not in a communication-ready state, the power management unit 59 interrupts the flow of the electric power to the specific low-power radio communication device 57 and thereby the specific low-power radio communication device 57 is deactivated.

Upon receipt of the in-communication signals transmitted by the users operation of the specific low-power radio transmitter (i.e., the remote control unit), the specific low-power radio communication device 57 in the intermittent standby state is switched to the activation state. Being activated, the specific low-power radio communication device 57 transmits the in-communication signals along the accessory-signal input line 44a to the startup management unit 74. Upon receipt of the in-communication signals, the startup management unit 74 starts to transfer the startup-signals along the startup-signal output line 44b to both the storage device 72 and the wireless LAN device 58. In transferring the startup-signals, the startup management unit 74 carries out a voltage transformation process in which voltage of the electric power sent along the power input line 42a from the main electronic power supply 55 is transformed to direct current, and thereby generates the startup-signals similar to the accessory-signals. That is, the startup-signals are direct current, i.e., a constant voltage of predetermined volts.

Because the startup-signals are similar to the accessory-signals, both the storage device 72 and the wireless LAN device 58 can be activated upon receipt of the startup-signals transmitted along the startup-signal output line 44b just as in the case where they receive the accessory-signals transmitted along the accessory-signal output line 43b. Because of the similarity between the accessory-signals and the startup-signals, input terminals on the startup-signal output line 44b to both the storage device 72 and the wireless LAN device 58 are practically combined with input terminals on the accessory-signal output line 43b to both of the storage device 72 and the wireless LAN device 58. In summary, the storage device 72 and the wireless LAN device 58 are activated upon receipt of either the accessory-signals or the startup-signals when electric power flows from the startup management unit 74 along the power output line 42b.

When the storage device 72 and the wireless LAN device 58 are activated, the data sent from the radio communication device 65 to the wireless LAN device 58 is transmitted to the storage device 72 along the data line 45 under the wireless LAN system and thereby the data is stored into the storage device 72.

In the interest of the simplicity of explanation, further operations other than those already described according to the second embodiment will not be described hereinafter. Further operations according to the second embodiment are the same as those according to the first embodiment.

According to the second embodiment, the power management unit 59 determines whether there exists an access point through which communication with the wireless LAN device 58 is established when the accessory-signal generating device 56 is switched-off. If there exists no such access point, the power management unit 59 interrupts the flow of electric power to the specific low-power radio communication device 57 and thereby the specific low-power radio communication device 57 is deactivated. In other words, the specific low-power radio communication device 57 is not activated unnecessarily. This will lead to the prevention of wasteful discharge of the electric power from the main electronic power supply 55.

The foregoing invention has been described in terms of preferred embodiments. However, those skilled in the art will recognize that many variations of such embodiments exist. Such variations are intended to be within the scope of the present invention and the appended claims.

Furthermore, it should be appreciated that each example or list contained in the detailed description of preferred embodiments is non-exclusive and is intended to encompass any now known or later developed members of the class represented by that example or list.

What is claimed is:

1. A power management system for a communication device connected to a vehicle navigation apparatus, comprising:

a main electric power supply for supplying electric power;

an accessory-signal generating device;

the communication device for communicating with an access point; and a power management device for determining whether the access point is communicable with the communication device just before the accessory-signal generating device is turned off, for supplying electric power from the main electric power supply to the communication device if the access point is communicable with the communication device just before the accessory-signal generating device is turned off, and not supplying electric power from the main electric power supply to the communication device if the access point is not communicable with the communication device just before the accessory-signal generating device is turned off.

2. The power management system according to claim 1, wherein the power management device supplies electric power to the communication device if a volume of communication traffic between the communication device and the access point is greater than a predetermined volume.

3. A vehicle navigation device comprising the power management system according to claim 1.

4. The power management system according to claim 1, the power management system further comprises a storage device for storing data transmitted from the access point via the communication device, wherein the power management device supplies electric power from the main electric power supply to the communication device and the storage device if communication between the communication device and the access point is established.

5. The power management system according to claim 4, wherein the storage device works on a standalone basis.

6. A power management system for a communication device connected to a vehicle navigation apparatus, comprising:

a main electric power supply for supplying electric power;

an accessory-signal generating device;

a first communication device for communicating with an access point;

a second communication device;

a power management device for determining whether the access point is communicable with the communication device just before the accessory-signal generating device is turned off, for supplying electric power from the main electric power supply to the second communication device if the access point is communicable with the communication device just before the accessory-signal generating device is turned off, and not supplying electric power from the main electric power supply to the second communication device if the access point is not communicable with the communication device just before the accessory-signal generating device is turned off; and a startup management device for activating the first communication device upon receipt of startup-signals from the second communication device.

7. The power management system according to claim 6, wherein the power management device supplies electric power to the first communication device if a volume of communication traffic between the first communication device and the access point is greater than a predetermined volume.

8. The power management system according to claim 6, wherein the second communication device is a specific low-power radio communication device for receiving a transmission from a remote device, and the startup signals are generated when the second communication device receives the transmission from the remote device.

9. A vehicle navigation device comprising the power management system according to claim 6.

10. A power management system for a communication device and a storage device connected to a vehicle navigation apparatus, comprising:

a main electric power supply for supplying electric power;

an accessory-signal generating device;

the communication device for communicating with an access point;

the storage device for storing data transmitted from the access point via the communication device; and a power management device for determining whether the access point is communicable with the communication device just before the accessory-signal generating device is turned off, for supplying electric power from the main electric power supply to the communication device and the storage device if the access point is communicable with the communication device just before the accessory-signal generating device is turned off, and not supplying electric power to the communication device if the access point is not communicable with the communication device just before the accessory-signal generating device is turned off 11. The power management system according to claim 10, wherein the storage device works on a standalone basis.

\* \* \* \* \*